United States Patent
Raye et al.

(10) Patent No.: US 9,604,611 B2
(45) Date of Patent: Mar. 28, 2017

(54) BRAKE SYSTEM MODULE REMOVABLY ATTACHABLE TO A VEHICLE

(71) Applicants: Victor J. Raye, Kansas City, MO (US); Jerry J. Donovan, Shawnee, KS (US); James L. Greene, Kansas City, MO (US)

(72) Inventors: Victor J. Raye, Kansas City, MO (US); Jerry J. Donovan, Shawnee, KS (US); James L. Greene, Kansas City, MO (US)

(73) Assignee: Haldex Brake Products Corporation, Kansas City, MO (US)

( * ) Notice: Subject to any disclaimer, the term of this patent is extended or adjusted under 35 U.S.C. 154(b) by 0 days.

(21) Appl. No.: 15/018,314

(22) Filed: Feb. 8, 2016

(65) Prior Publication Data

US 2016/0152215 A1 Jun. 2, 2016

Related U.S. Application Data

(60) Continuation of application No. 14/295,964, filed on Jun. 4, 2014, now Pat. No. 9,267,520, which is a
(Continued)

(51) Int. Cl.
*F16M 13/00* (2006.01)
*B60T 8/176* (2006.01)
(Continued)

(52) U.S. Cl.
CPC .............. *B60T 8/176* (2013.01); *B60C 23/10* (2013.01); *B60T 7/20* (2013.01); *B60T 8/3685* (2013.01); *B60T 15/36* (2013.01); *B62B 9/08* (2013.01); *B62D 27/065* (2013.01); *F16B 2/02* (2013.01); *F16B 5/00* (2013.01); *F16B 5/08* (2013.01); *Y10T 29/4973* (2015.01); *Y10T 29/49826* (2015.01); *Y10T 403/45* (2015.01);
(Continued)

(58) Field of Classification Search
CPC .... F16M 13/02; F16M 13/022; F16M 11/041; F16M 13/00; F16M 11/10; F16M 11/24; F16M 2200/022; F16M 2200/027; F16M 11/08; F16M 11/04; F16M 11/14; F16M 11/2014; F16M 11/28; F16M 11/06
USPC ...... 248/229.1, 229.11, 229.2, 229.21, 228.1, 248/228.2, 220.21, 220.22; 105/355, 404
See application file for complete search history.

(56) References Cited

U.S. PATENT DOCUMENTS

925,677 A 6/1909 Belcher
1,028,432 A 6/1912 Candland
(Continued)

*Primary Examiner* — Steven Marsh
(74) *Attorney, Agent, or Firm* — St. Onge Steward Johnston & Reens LLC (57) ABSTRACT

An anti-lock brake system module for a trailer or dolly, including a module panel having a front side and a back side facing in an opposite direction to the front side, a plurality of anti-lock brake system components, at least a portion of the components attached to the front side of the module panel and at least a portion of the components attached to the back side of the module panel, the plurality of anti-lock brake system components including an anti-lock brake valve and an electronic control unit, and a mounting element for removably connecting the module panel to a mounting location, such as an I-beam, of the trailer or dolly.

20 Claims, 10 Drawing Sheets

Related U.S. Application Data continuation of application No. 13/189,344, filed on Jul. 22, 2011, now Pat. No. 8,777,169, which is a division of application No. 12/392,819, filed on Feb. 25, 2009, now Pat. No. 8,511,929.

(51) Int. Cl.
| | |
|---|---|
| B60T 7/20 | (2006.01) |
| B60T 8/36 | (2006.01) |
| B62D 27/06 | (2006.01) |
| F16B 2/02 | (2006.01) |
| F16B 5/00 | (2006.01) |
| F16B 5/08 | (2006.01) |
| B60C 23/10 | (2006.01) |
| B60T 15/36 | (2006.01) |
| B62B 9/08 | (2006.01) |

(52) U.S. Cl.
CPC .......... Y10T 403/478 (2015.01); Y10T 403/70 (2015.01); Y10T 403/7062 (2015.01); Y10T 403/7075 (2015.01); Y10T 403/7105 (2015.01); Y10T 403/73 (2015.01); Y10T 403/75 (2015.01)

(56) References Cited

U.S. PATENT DOCUMENTS

| | | | |
|---|---|---|---|
| 1,102,502 A | 7/1914 | Hansbrough | |
| 1,230,441 A | 6/1917 | Stevens | |
| 1,281,531 A | 10/1918 | Dietrich | |
| 1,801,474 A | 4/1931 | Williams | |
| 1,813,545 A | 7/1931 | Reinhold | |
| 2,595,352 A * | 5/1952 | Graham | A01B 35/24 172/681 |
| 3,124,330 A | 3/1964 | Robinson | |
| 3,871,150 A | 3/1975 | Murray et al. | |
| 4,294,053 A * | 10/1981 | Lopes | E02D 5/80 403/154 |
| 5,104,079 A | 4/1992 | hardtke | |
| 5,146,724 A | 9/1992 | Angelo | |
| 5,595,363 A | 1/1997 | De Leebeeck | |
| 5,676,271 A | 10/1997 | Reynard | |
| 5,739,592 A | 4/1998 | Rigsby et al. | |
| 5,743,192 A | 4/1998 | Saxton et al. | |
| 6,264,286 B1 | 7/2001 | Ehrlich et al. | |
| 6,378,923 B1 | 4/2002 | Campbell | |
| 6,474,902 B1 | 11/2002 | Beauvoir | |
| 6,520,705 B2 * | 2/2003 | Stasney, Jr. | F16B 2/065 248/72 |
| 6,545,593 B2 | 4/2003 | DeWilde | |
| 6,802,169 B2 | 10/2004 | Simmons | |
| 6,874,741 B2 | 4/2005 | Mirsberger et al. | |
| 6,974,276 B2 | 12/2005 | KKirchner et al. | |
| 7,090,427 B2 | 8/2006 | Petratto | |
| 7,874,120 B2 | 1/2011 | Ohata et al. | |
| 7,922,145 B2 | 4/2011 | Martin | |
| 8,167,258 B1 | 5/2012 | Wentworth et al. | |
| 2004/0244330 A1 | 12/2004 | Takeuchi et al. | |
| 2005/0275281 A1 | 12/2005 | Prescott | |
| 2007/0176059 A1 | 8/2007 | Roscetti et al. | |
| 2008/0030072 A1 | 2/2008 | Legeza et al. | |
| 2008/0283702 A1 | 11/2008 | Ikerd | |
| 2011/0236128 A1 | 9/2011 | Raye et al. | |

* cited by examiner

BRAKE SYSTEM MODULE REMOVABLY ATTACHABLE TO A VEHICLE

FIELD OF THE INVENTION

The present invention relates to a system module that is mounted onto a mounting surface of a trailer/dolly. More particularly, the system module is mounted to an I-beam or C-channel of the trailer/dolly via fasteners or clamps. This allows the system module to be easily removable and replaceable, minimizing trailer/dolly down time as well as diagnostic troubleshooting/repair time. More particularly, the present invention uses a system module for a trailer/dolly air brake system.

BACKGROUND OF THE INVENTION

Tractor-trailer and dolly systems are used to transport large quantities of cargo across the United States. Various industries and consumers are dependent upon these trailer/dolly systems for the transport of their goods. In particular, the shipping industry, including large companies such as UPS®, FedEx®, and the United States Postal Service® among others, utilize trailer/dolly systems to transport and ship goods to consumers. These systems help the shipping industry adequately transport goods in order to meet the demand of US consumers, which require huge volumes of goods to be shipped daily.

What makes trailer/dolly systems unique is that these vehicles are constantly being used and operated. Companies try to maximize use of trailer/dolly systems, as this allows companies to fully allocate their resources and limit costs. In fact, companies work under the operational model whereby trailer/dolly systems are in constant use. This saves the industry thousands, if not millions, of dollars in operational savings.

Inevitably, however, trailer/dolly downtime does occur when trailer/dolly systems are serviced. This disrupts the operational model of the shipping companies and results in delays, which results in monetary and operational loses. When trailer/dolly downtime occurs, the shipping industry loses money as it cannot maximize the efficiency of the trailer/dolly systems. Additional trailer/dolly systems are then utilized, either by being purchased as a backup or rented from another company. In both instances this costs companies time and money, as inefficiencies in the operational model persist.

As noted above, it is thus desirable to avoid trailer/dolly downtime, especially periodic causes of downtime. One such periodic cause of trailer/dolly downtime could be the Anti-Lock Brake (ABS) system module. Other such periodic causes of trailer/dolly downtime could be the Booster Valve and Pressure Protection Valve, other such valves in a trailer/dolly, as well as trailer/dolly control and hydraulic systems. Trailer/dolly systems must have periodic maintenance checks for safety reasons. Downtime as a result of a these periodic maintenance checks costs companies time and money.

It is thus desirable to reduce, if not limit entirely, the amount of trailer/dolly downtime due to periodic service and repair.

Prior art designs of system modules on trailer/dolly systems required the entire trailer/dolly vehicle to be inoperable if a problem in the system module occurred. Thus, when the system module had to be replaced, the entire trailer/dolly assembly was down and could not be used. Furthermore, prior art designs of system modules for trailer/dolly systems occasionally would fail, resulting in insurance cost increases to the owner's of the trailer/dolly system. Prior art designs would also be installed incorrectly, thus increasing operation cost both in early and unnecessary repair and replacement cost.

What is thus desired, therefore, is an apparatus and method for providing a system module that can be easily be removed and replaced to minimize trailer/dolly downtime. If a problem is detected in a module attached to a trailer/dolly vehicle, the module can be quickly replaced with another module, allowing for continued use of the trailer/dolly vehicle, and minimizing trailer/dolly downtime.

It is further desirable to provide for an apparatus and method for allowing for quick and easily installation of a system module. It is further desirable for a method that eliminates installation errors during the installation of a system module, thus minimizing operation cost both in early and unnecessary repair and replacement. It is further desirable to minimize catastrophic failures resulting in insurance cost savings, as well as to reduce diagnostic troubleshooting and repair time for system modules.

It is further desirable to provide a special clamp that allows for the other desired objects of the present invention.

SUMMARY OF THE INVENTION

Accordingly, it is an object of the present invention to provide an apparatus and method for providing a system module that can be easily be removed and replaced to minimize trailer/dolly downtime. Specifically, the system module pertains to a trailer/dolly air brake system module. It is a further object of the invention to quickly replace a system module with another system module, allowing for continued use of the trailer/dolly vehicle. It is a another object of the invention to reduce installation time of a system module, and eliminate installation errors of the system module, thus minimizing operation cost in both early and unnecessary repair and replacement cost, as well as minimizing catastrophic failures resulting in insurance cost saving. It is another object of the present invention to provide a special clamp to achieve other objects of the present invention.

These and other objectives are achieved by providing an apparatus for a system module including a system module, a mounting element, and a mounting surface, wherein said mounting element attaches said system module to said mounting surface, and wherein said mounting surface is an element of a vehicle. While the mounting surface is generally either an I-beam or C-channel, the mounting surface may also be another element of a trailer/dolly system. Furthermore, the attachment of the mounting element to the mounting surface of the apparatus is done either by welding, through a fastening device, a clamping device, or a combination of these devices and methods. Also, the mounting element could be another such element or technique used in the industry that can attach and support the mounting element to the mounting surface, but can also allow quick removal of the system module. The mounting element could involve various elements, such elastics and other such flexible and strong materials, to attach the system module to the mounting surface, and also allow for the system module to be removed from the mounting element and mounting surface.

In particular, a unique clamp and clamping system designed by Haldex® achieves this objective, and is a mounting element to be used in an embodiment of the present invention. The Haldex® clamp provides increased ease of use, durability, and longevity, as it attaches the system module to the mounting element, whereby the mounting element is generally an I-beam.

Specifically, the Haldex® clamp includes a pair of oppositely disposed clamping members for engaging laterally opposite flanges of a mounting surface, each clamping member having a lug portion thereof, a pair of brackets disposed between the lug portions of the clamping members, the brackets secured to the clamping members via fasteners, where the brackets are adapted to receive a panel.

The Haldex® clamp may have said pair of brackets secured to each other via fasteners. The clamping members on the Haldex® clamp may be C-shaped and the brackets may be L-shaped.

In an embodiment, the brackets of the clamp face each other to form a T-shape, forming a groove in between the brackets. A panel is disposed in the groove between the brackets and is secured via fasteners. These fasteners may be easily removed allowing the panel to be removed from the brackets, and thus from the clamp.

The Halex® clamp is typically for use with an I-beam, though the clamp may have other uses. When used with an I-beam, the clamping members of the Haldex® clamp attach to the laterally opposite flanges of a lower flange portion of the I-beam. The clamp functions by having its fasteners tighten the clamping members around the I-beam to secure the clamp to the I-beam.

Another embodiment of the present invention involves a clamping system including a pair of clamps for engaging two separate mounting surfaces, the clamps each having a pair of oppositely disposed clamping members for engaging laterally opposite flanges of the mounting surfaces, each clamping member having a lug portion thereof, the clamps each having a pair of brackets disposed between the lug portions of the clamping members, wherein the brackets are secured to the clamping members via fasteners, and a module panel, the module panel secured to each of the clamps.

The clamping system further may have fasteners that secure the module panel to each of the clamps. The clamping members may be C-shaped. The brackets may be L-shaped. Furthermore, the brackets on each of the clamps may face each other to form a T-shape, forming a groove in between the brackets for each of the clamps. This allows the panel to be disposed in the groove of each of the clamps and allows the panel to be secured to the brackets of each of the clamps via fasteners.

The clamping system may have mounting surfaces selected from a group consisting of an I-beam or a C-channel, or a combination thereof. An I-beam is preferred for use with the clamping system.

Another embodiment involves a method for assembly of a clamp including introducing a pair of oppositely disposed clamping members for engaging laterally opposite flanges of a mounting surface, each clamping member having a lug portion thereof, introducing a pair of brackets, disposing the brackets between the lug portions of the clamping members, and fastening the brackets to the clamping members.

The clamping members of this method may be C-shaped. The brackets may be L-shaped. The method further may have the fasteners tighten the clamping members around the I-beam to secure the clamp to the I-beam. The method further may involve inserting a panel between the brackets, and securing the panel to the brackets via fasteners. The mounting surface of the method is selected from a group consisting of an I-beam or a C-channel, although an I-beam is preferred.

The Haldex® clamp, Haldex® clamping system, and method for Haldex® clamp assembly are all focused on the mounting element of the present invention which connects the mounting surface to the system module.

In another embodiment of the present invention, the system module can be repaired without disturbing the continued use of the vehicle. This is done by first removing the system module from the mounting surface, and once removed, the system module can be replaced by a second system module, and the second system module will then allow for continued use of the vehicle. This allows for any or all components of the trailer/dolly air brake system module to be easily and efficiency replaced by a similar components or an air brake system module, thus minimizing downtime of the trailer/dolly system.

Typical vehicles that can use the present invention are selected from, but not limited to, a group consisting of semi-trailers, dolly, semi-trailer trucks, lorry's, side lifters, reefers, vans, flat beds, tanker trailers, dump trailers, road trains, or other commercial and heavy duty vehicles that use an air/hydraulic system, or other such vehicles In other embodiments of the invention, the invention involves a method of removing and replacing a system module from a vehicle including introducing a system module, introducing a mounting element, wherein the mounting element attaches the system module to a mounting surface on the vehicle.

The method further includes removing said system module by disengaging said system module from said mounting element, introducing a second system module, and engaging said second system module with said mounting element, wherein said second system module allows for continued use of said vehicle.

The method further uses a mounting surface selected from a group consisting of an I-beam or C-channel. However, the mounting surface can be another part associated with a trailer/dolly vehicle. Furthermore, the mounting element is selected from a group consisting of a fastening device, and/or a clamping device, however, other methods may also be used to connect the system to the mounting surface. More than one of these methods can be used in conjunction with one another to mount the system module to the mounting surface. In a specific embodiment of this method, the system module used is an air brake trailer/dolly system module.

The method further applies to a vehicle from a group consisting, but not limited to, semi-trailers, dolly, semi-trailer trucks, lorry's, side lifters, reefers, vans, flat beds, tanker trailers, dump trailers, road trains, or other commercial and heavy duty vehicles that use air/hydraulic systems.

The method further includes the step of easing the installation of the system module. The method further includes the step of servicing the system module and inserting the system module into another vehicle. This allows for system modules to be used interchangeably, thus minimizing downtime of the vehicle. This downtime can be limited, whereby the time to remove and replace a system module with a second system module takes under an hour. More preferably, the downtime can be limited to 30 minutes, whereby it take approximately 30 minutes or less to remove and replace a system module from a mounting surface.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
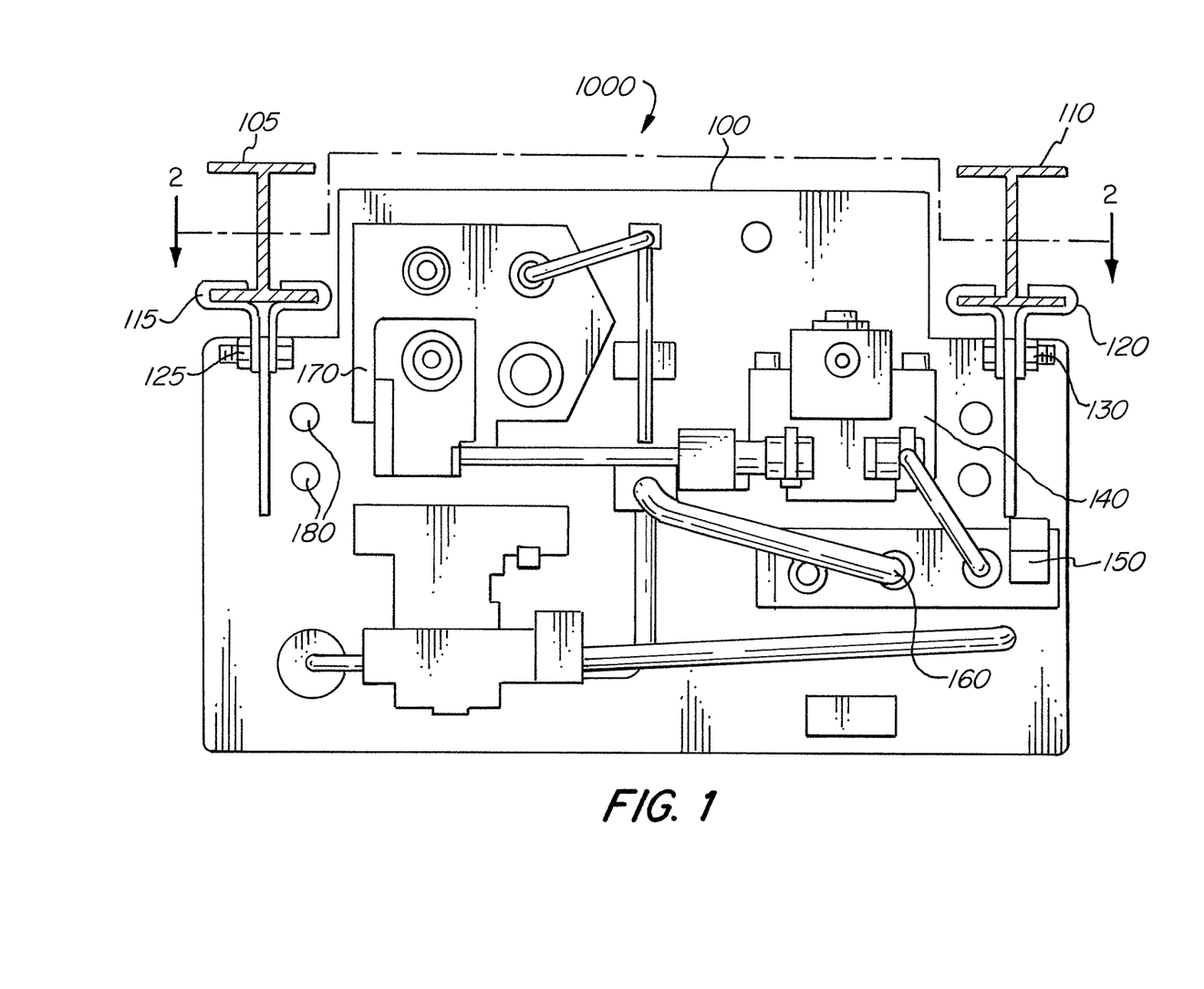
FIG. 1 is a perspective view of the front side of a module panel with various system elements connected to a mounting surface according to one embodiment of an apparatus illustrating principles of the present invention.

Referring to FIG. 1, a module panel 100 is shown in accordance with the present invention. The module panel is shown attached to a mounting surface 105, 110 via mounting elements 115, 120. These mounting elements can be either fasteners, clamps, or a combination of the same. Welding may also be used to attach the mounting element 115, 120 to the mounting surface 105,110, however to attach the module panel 100 to the mounting element 115,120, welding should not be used, as the module panel 100 needs to be easily removable from the mounting element 115, 120. In FIG. 1, fasteners 125 and 130 are used to hold and tighten the mounting elements 115, 120, which are designed to go around and attach the mounting surface 105, 110 to the module panel 100.

FIG. 1 shows an embodiment whereby the mounting surface 105, 110 is shown as a trailer I-beam. However, the mounting surface 105, 110 may also be a C-channel or other such mounting surface for mounting a system module 1000 onto a trailer or dolly vehicle.

FIG. 1 further shows elements that are arranged on the module panel 100. These elements make up the system module 1000. The order and arrangement of the elements that make up the system module 1000 can vary. Shown in FIG. 1 are booster valve 140, manifold valve 150, check valve 160, and FFABS valve with electronic control unit 170. These elements are part of system module 1000, and are mounted onto the module panel 100. Further control system elements can be added to the module panel 100 that are not shown and an advantage of using a module panel 100 is that additional elements can be added to the module panel, such as, but not limited to the following elements: Tire Inflation System, FFABS Valve with ECU, 6-Port Valve with ECU, 2-Port Valve with ECU, Suspension Dump Valve, Suspension Pilot Valve, In-Line Filters, One Way check Valves, Quick Release Valve, Pressure Protection Valve, Lift Axle Valve, Trailer Brake Control Valve, Power Junction Box, Warning Lamp, Alarm box, Vehicle Weight Monitor, and Diagnostic Tool or Diagnostic Interface Tool.

In fact, various designs that make up a system module 1000 may be used so long as the designs can fit on a module panel 100. This allows for different system modules with varying elements to be used with the present invention. Typically, the module panel 100 is made of metal or a type of metal alloy, although other types of materials may also be used.

Furthermore, fasteners 180 are also shown in FIG. 1, which provide further support to attach the module panel 100 to the mounting element 115, 120. These fasteners are not necessary for all embodiments of the invention, and can be used with and without other mounting elements.

Figure 2:
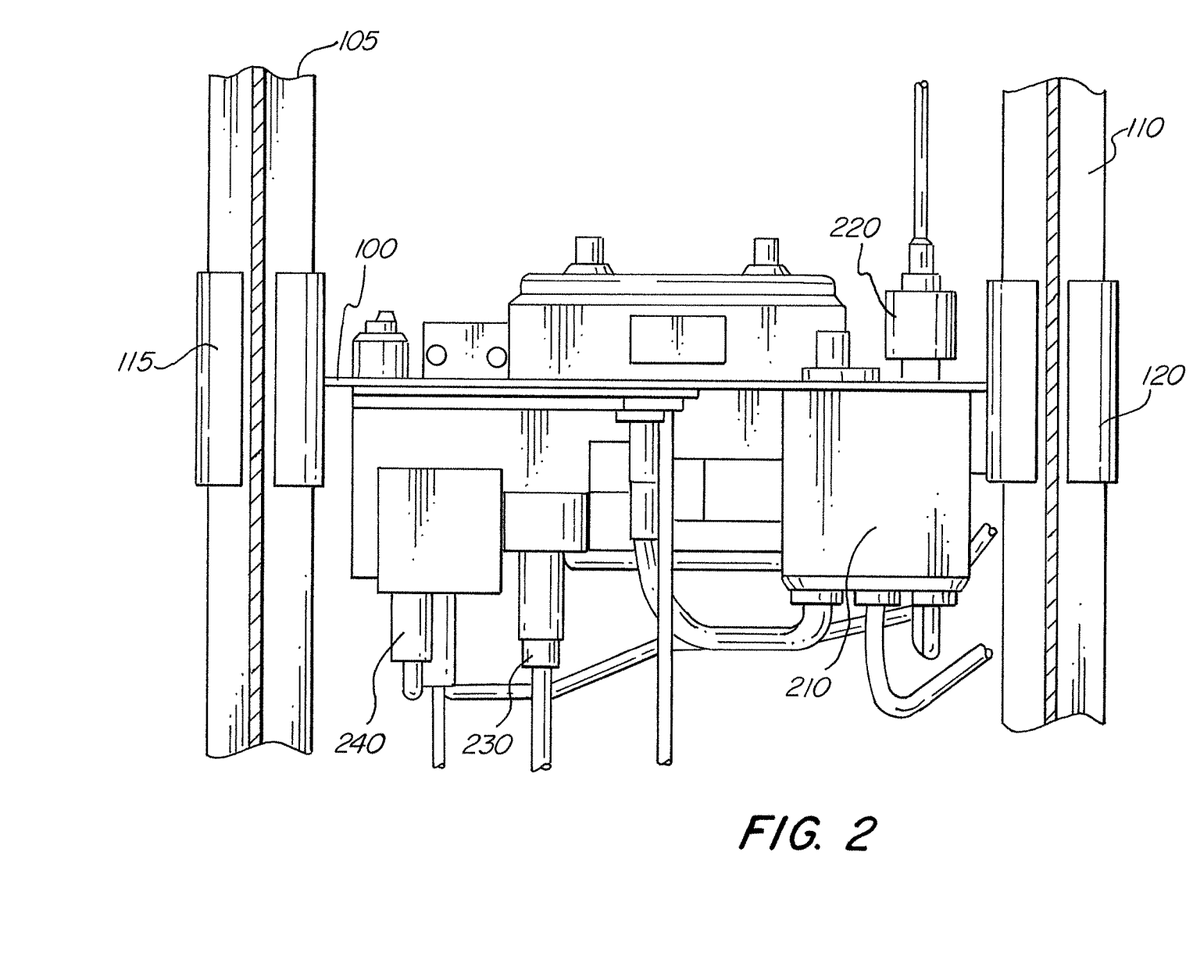
FIG. 2 is a top view of the module panel shown in FIG. 1.

FIG. 2 shows a Top View of the embodiment of the present invention shown in FIG. 1. Referring to FIG. 2, mounting elements 115, 120 are shown attached to mounting surfaces 105, 110. The module panel 100 is also shown suspended between the mounting surfaces 105, 110. Elements attached to the module panel are shown including air brake monitoring system 210 as well as various pressure valves 220, 140 and 170.

Figure 3:
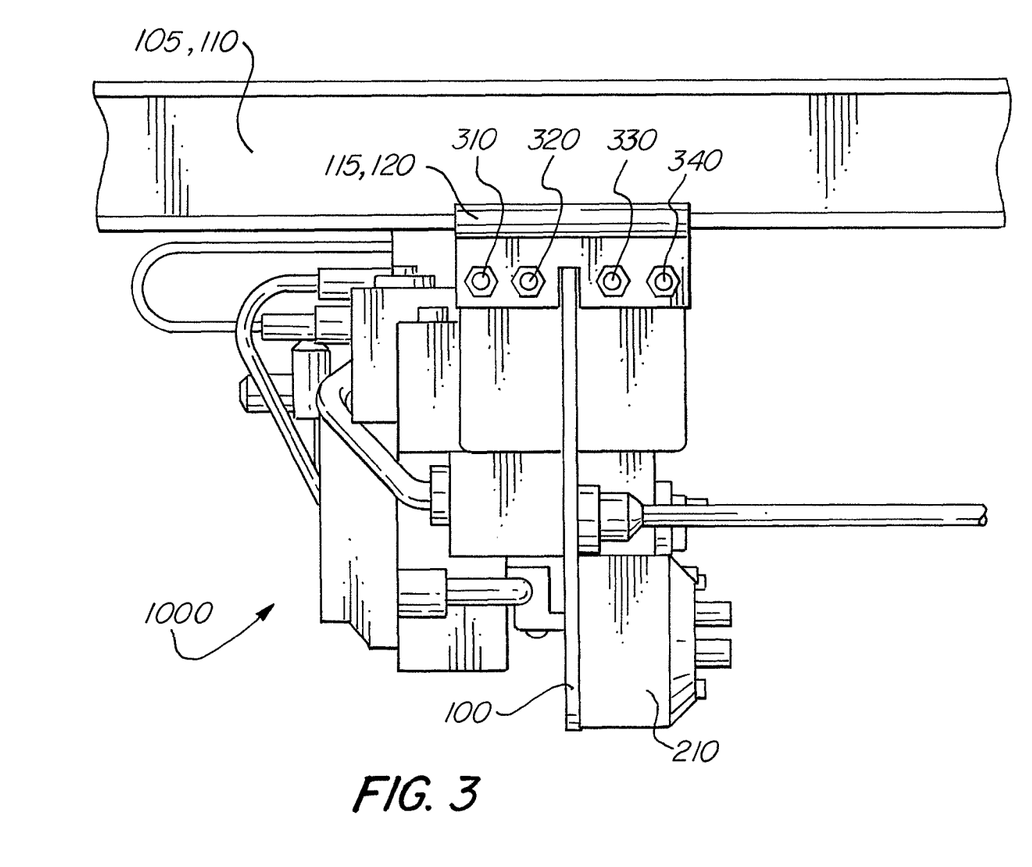
FIG. 3 is a side view of the module panel shown in FIG. 1 showing the connection to the mounting surface.

Referring to FIG. 3, a side view of the embodiment of FIG. 1 of the present invention is shown. Here, one can see mounting element 115, 120 attaching the module panel 100 to mounting surface 105, 110. The module panel 100 holds the elements of system module 1000.

FIG. 3 also shows the use of fasteners 310, 320, 330, and 340 that are used tighten mounting element 115, 120. As shown, the mounting element 115, 120 is designed to attach to the mounting surface 105, 110, attaching to the module panel 100 to the mounting surface 105, 110. Furthermore, elements such as air brake monitoring system 210 and others are show in FIG. 3.

Figure 4:
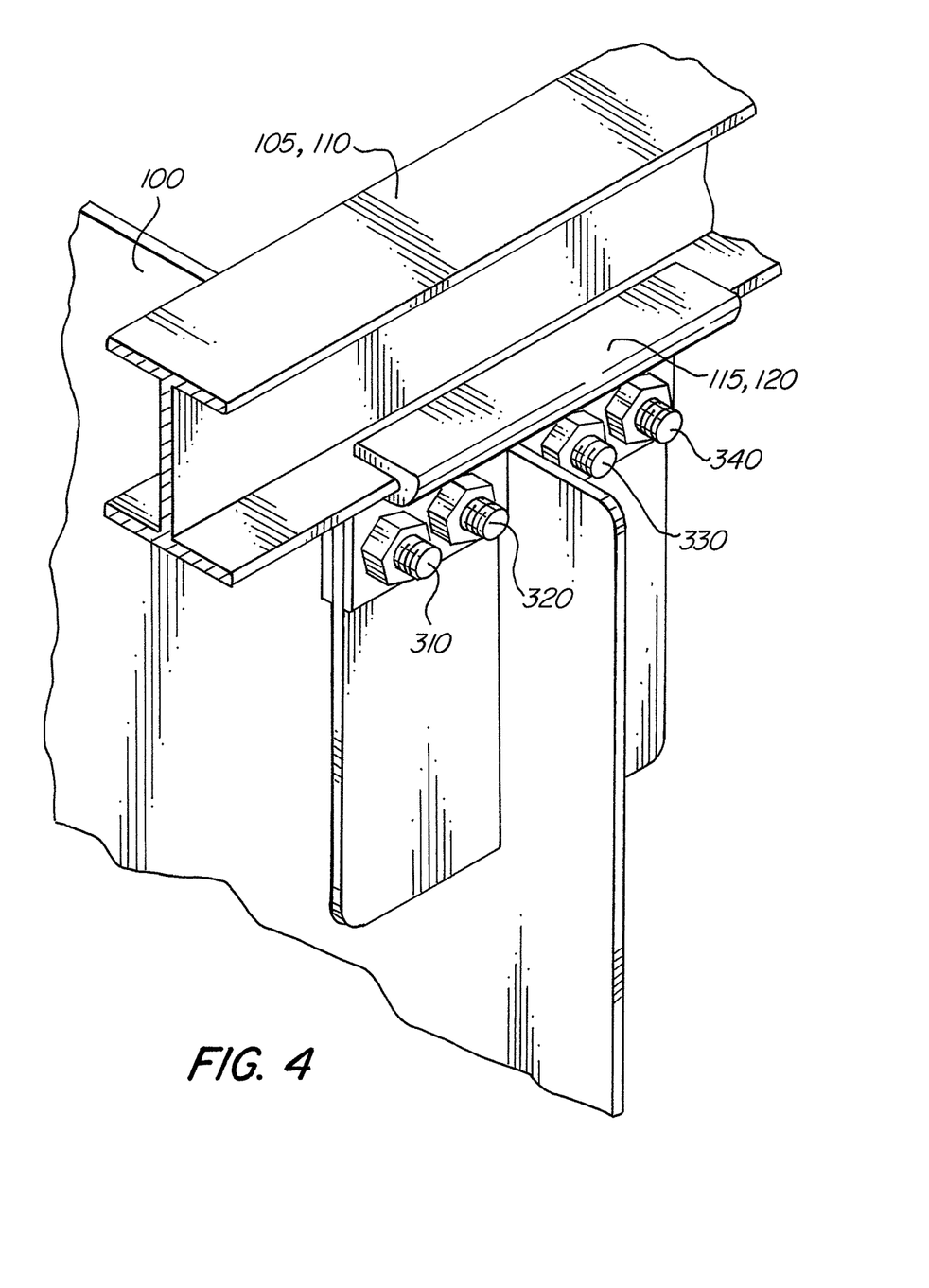
FIG. 4 is a simplified view of the mounting element attaching the system module to the mounting surface.

Referring to FIG. 4, a simplified view of the mounting element 115, 120 is shown attaching the module panel 100 to the mounting surface 105, 110. Fasteners 310, 320, 330, and 340 are shown with nut and bolt elements respectively. These nut and bolt fasteners may also be reduced to 2 nut and bolt fasteners and can also be replaced by screws and other such fastening devices that are used in the industry.

Figure 5:
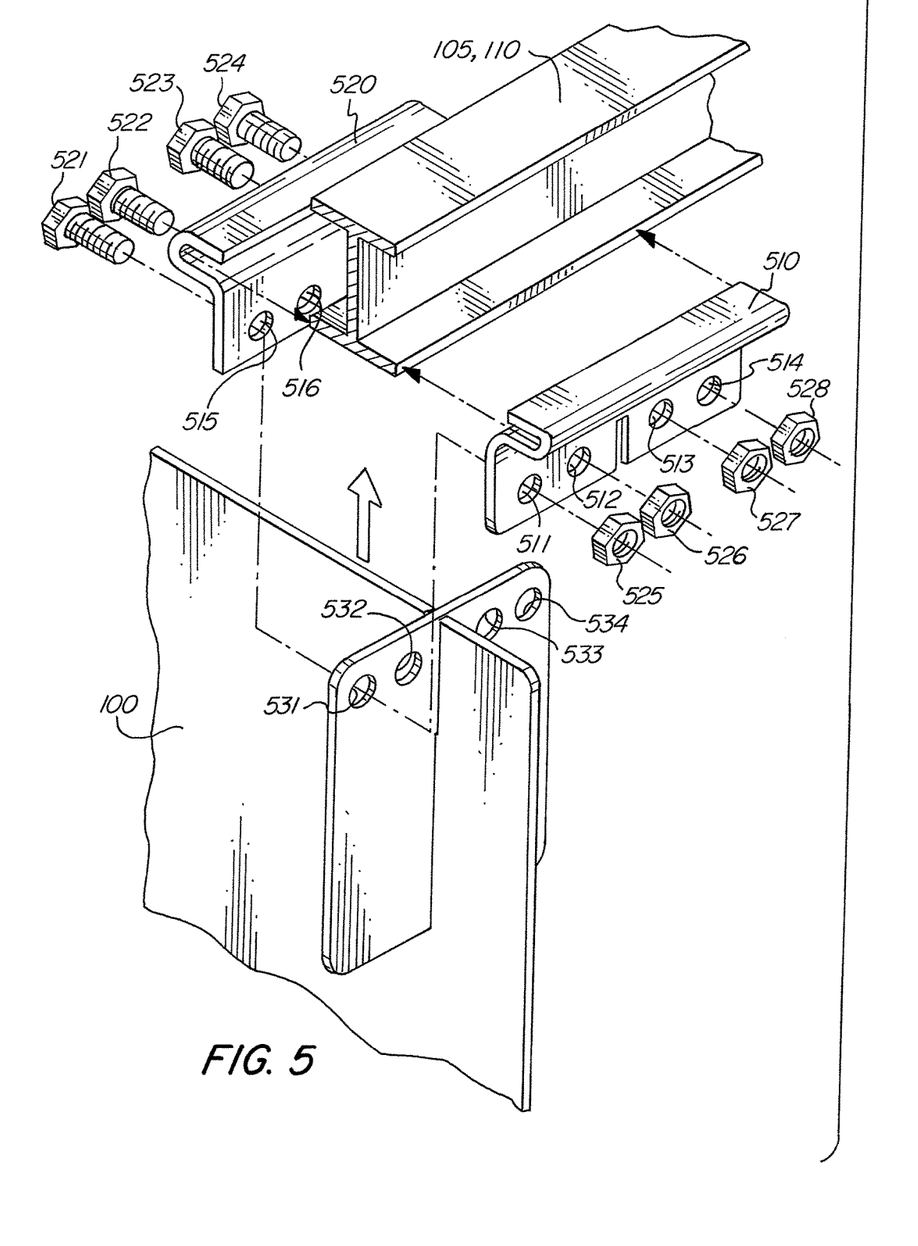
FIG. 5 is an exploded view of the invention shown in FIG. 4 showing the mounting elements used to attach the system module to the mounting surface.

FIG. 5 shows an exploded view of FIG. 4, where the mounting mechanism is clearly shown. Here, mounting surface 105, 110 is shown with module panel 100 shown suspended below. Mounting element 115, 120 is shown as being composed of pieces 510 and 520 as well as bolts 521, 522, 523, 524 and nuts 525, 526, 527, and 528.

As shown, element 510 and 520 have holes 511, 512, 513, 514, 515, 516, and 517-518 (not shown). Module panel 100 has holes 531, 532, 533, and 534. These holes allow for the bolts 521-524 to go through the holes, allowing for elements 510, 520 to and module panel 100 to be attached, thus attaching the module panel 100 to the mounting surface 105, and 110. The invention can comprises additional or fewer holes in various embodiments. Additional fastening elements can also be used.

Figure 6:
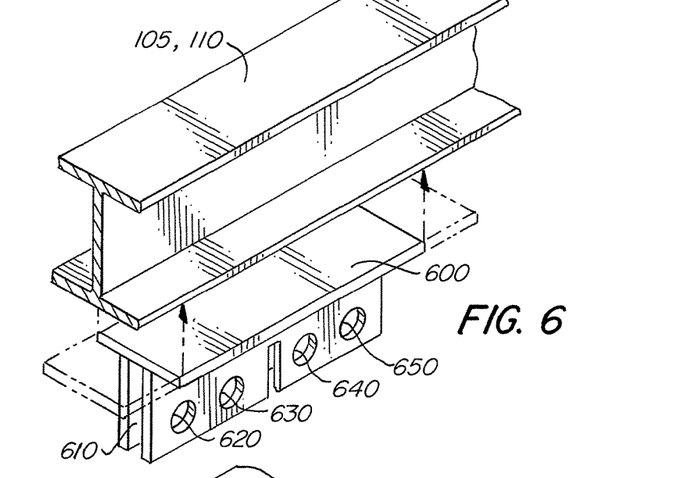
FIG. 6 is a view of the mounting element using to attach the system module to the mounting surface according to another embodiment of the present invention.

Another embodiment of the present invention is shown in FIG. 6. Here mounting surface 105, 110 is shown with mounting element 600. This mounting element 600 is of a different design that the mounting elements 115, 120 shown in other embodiments, as mounting element 600 does not have elements that go around and attach to the lower part of the I-Beam as shown in FIGS. 1-5. Instead, the mounting element 600 is attached to the mounting surface via a different type of attachment mechanism. Mounting element 600 has a groove 610 for holding the module panel 100 (not shown). Mounting element 600 also has holes 620, 630, 640, and 650 used to support fasteners (not shown) such that the module panel 100 can be attached and locked with the mounting element 600.

Figure 7:
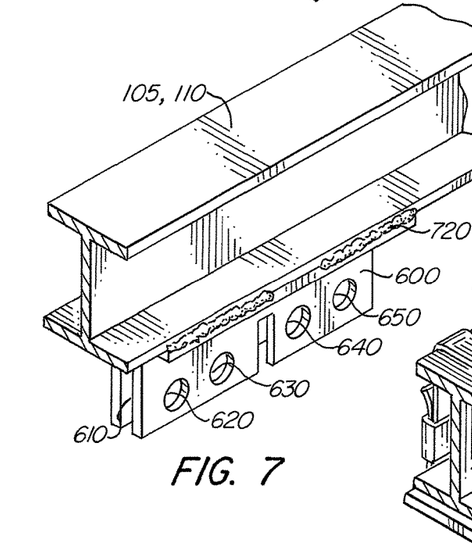
FIG. 7 is a view of the mounting element using welding to attach the system module to the mounting surface according to another embodiment of the present invention.

FIG. 7 shows the mounting element 600 welded to the mounting surface 105, 110 via welding elements 710 and 720. More or less welding can occur in various embodiments of the invention. A module panel 100 would then be able to be attached to the mounting element 600 through groove 610 as well as holes 620, 630, 640, and 650. Fasteners (not shown) would attach and tighten the module panel 100 to the mounting element 600.

Figure 8:
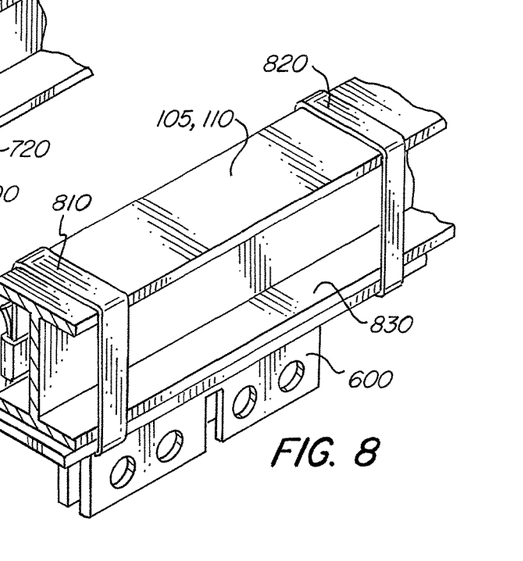
FIG. 8 is a view of the mounting element using a flexible elastic to attach the system module to the mounting surface according to another embodiment of the present invention.

FIG. 8 is a view of the mounting element 600 being attached to the mounting surface 105, 100 via flexible elastics 810 and 820. These elastics surround the entire mounting surface 105, 110, as shown, instead of linking to the bottom flange 830 of the mounting surface 105, 110. As described in FIG. 7, a module panel 100 would then be able to be attached to the mounting element 600 through groove 610 as well as holes 620, 630, 640, and 650. Fasteners (not shown) would attach and tighten the module panel 100 to the mounting element 600.

Figure 9:
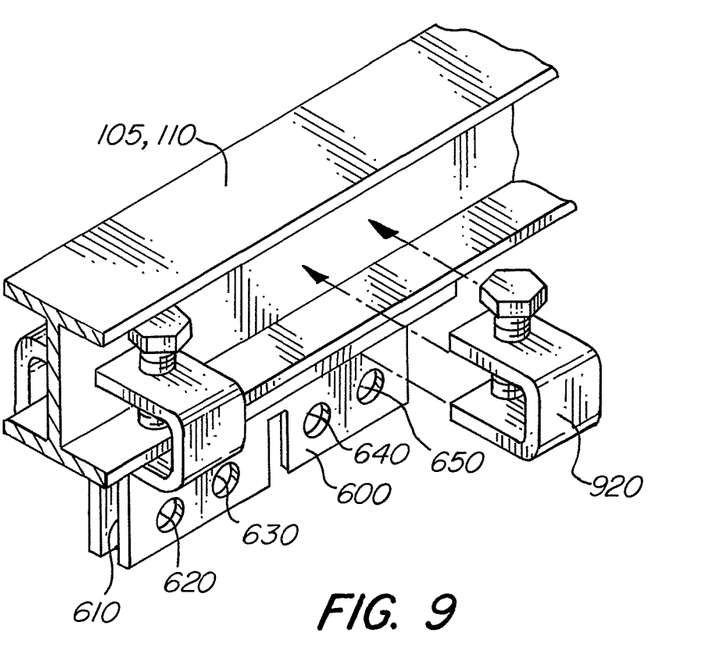
FIG. 9 is a view of the mounting element using a clamp to attach the system module to the mounting surface according to another embodiment of the present invention.

FIG. 9 is a view of the mounting element 600 being attached to the mounting surface 105, 110 via clamps 910 and 920. Various clamps may be used including clamps specially designed by Haldex to clamp to a mounting surface on a trailer/dolly. The clamps tighten and allow the mounting element to attach to the mounting surface 105, 110. As described in FIG. 7, a module panel 100 would then be able to be attached to the mounting element 600 through groove 610 as well as holes 620, 630, 640, and 650. Fasteners (not shown) would attach and tighten the module panel 100 to the mounting element 600.

FIGS. 1-9 show the attachment of a system module 1000 to a mounting element 115, 120 attached to a mounting surface 105, 110, where the system module 1000 is preferably a trailer/dolly air brake system module.

Figure 10:
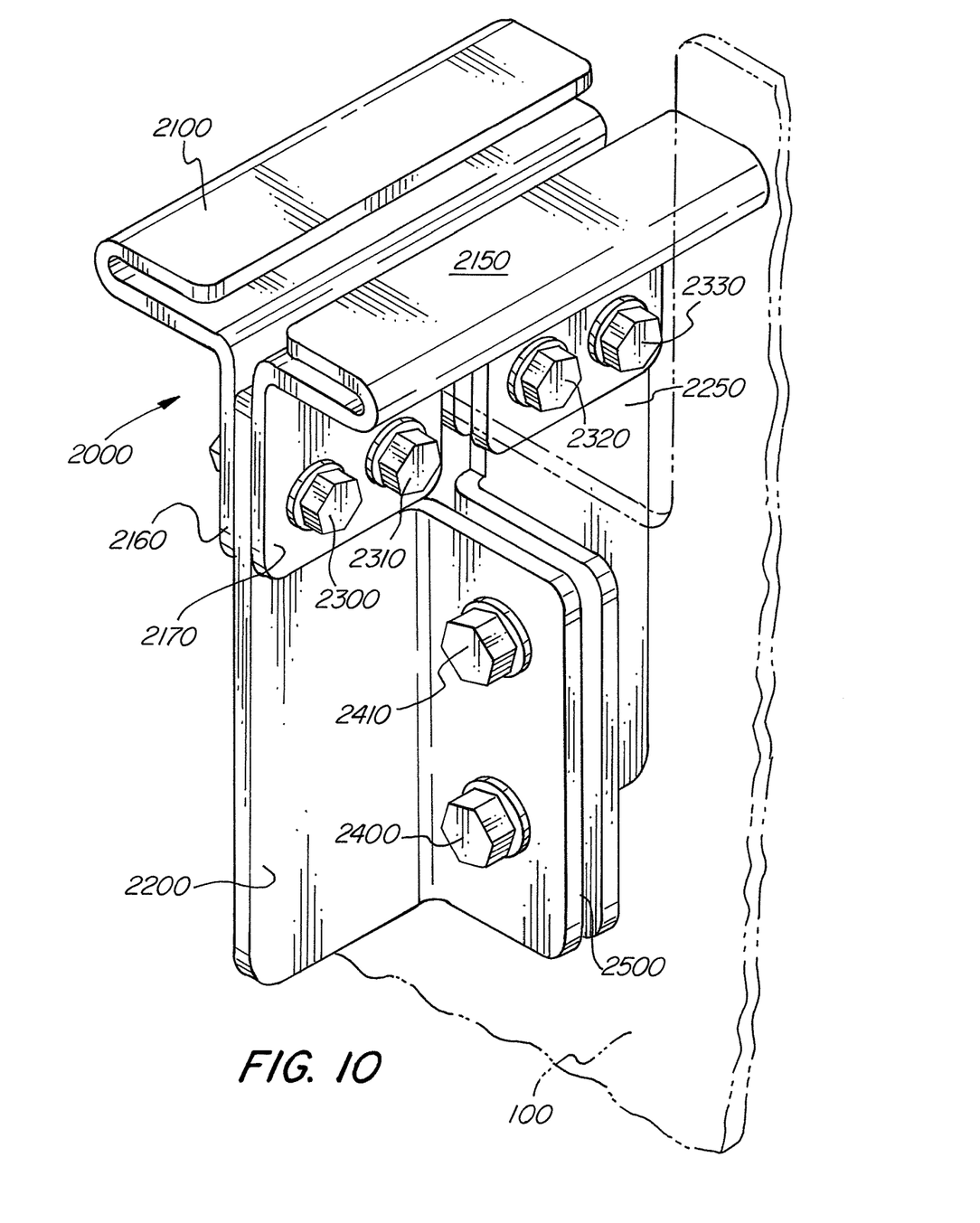
FIG. 10 is a perspective view of the Haldex® clamp.

FIG. 10 shows use of clamp 2000 designed by Haldex®. The clamp 2000 attaches the system module 1000 to the mounting surface 105,110 (not shown in FIG. 10). This Halex® clamp has the unique ability as it provides increased ease of use, durability, and longevity, as it attaches the system module 1000 to the mounting surface 105,110, whereby the mounting element is typically an I-beam.

Shown in FIG. 10, clamp 2000 comprises a pair of oppositely disposed clamping members 2100, 2150 for engaging laterally opposite flanges 2010, 2020 of a mounting surface 105, 110, each clamping member having a lug portion 2160 and 2170 thereof. Clamp 2000 also has a pair of brackets 2200, 2250 disposed between said lug portions 2160, 2170 of said clamping members 2100, 2150, said brackets 2200, 2250 secured to said clamping members 2100, 2150 via fasteners 2300, 2310, 2320, and 2330. The brackets 2200, 2250 are adapted to receive a panel 100

Clamp 2000 is also shown wherein said pair of brackets 2200, 2250 are secured to each other via fasteners 2400, 2410. The clamping members 2100, 2150 are shown to be C-shaped and the brackets 2200, 2250 are L-shaped.

FIG. 10 shows the brackets 2200, 2250 facing each other to form a T-shaped forming groove 2500 between said brackets 2200, 2250.

Panel 100 is shown disposed in groove 2400 and panel 100 is secured to said brackets 2200, 2250 via fasteners 2400, 2410. These fasteners 2400, 2410 can be easily removed from the brackets 2200, 2250 allowing for easy removal of panel 100 from the clamp 2000.

Figure 11:
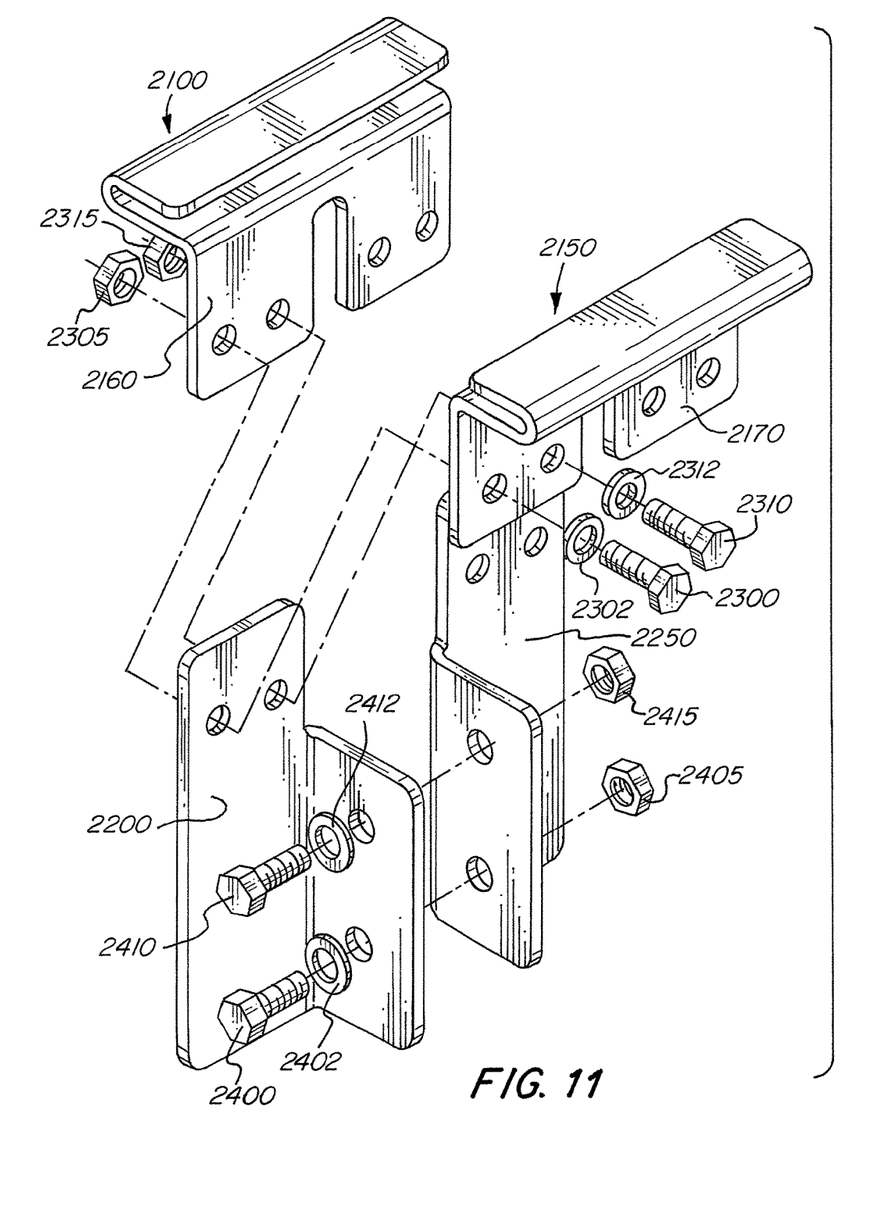
FIG. 11 is an exploded view of the Haldex® clamp.

FIG. 11 shows an exploded view of the Haldex® clamp 2000. Here, clamping members 2100, 2150 are shown being able to attach to each other and to brackets 2200, 2250 via fasteners. The fasteners are typically made of screws 2300, 2310, washers 2302, 2312, and nuts 2305, 2315.

The brackets 220, 2250 are shown being attach to attach to each other via fasteners, which involve screws 2400, 2410, washers 2402, 2412, and nuts 2405, 2415.

Clamp 2000 has laterally opposite flanges 2010, 2020 that are part of lower flange portion of said mounting surface 105, 110, which is generally an I-beam. Fasteners 2300, 2310, 2320, and 2330 tighten clamping members 2100, 2150 around the mounting surface 105, 100 to secure clamp 2000 to the mounting surface 105, 100.

Figure 12:
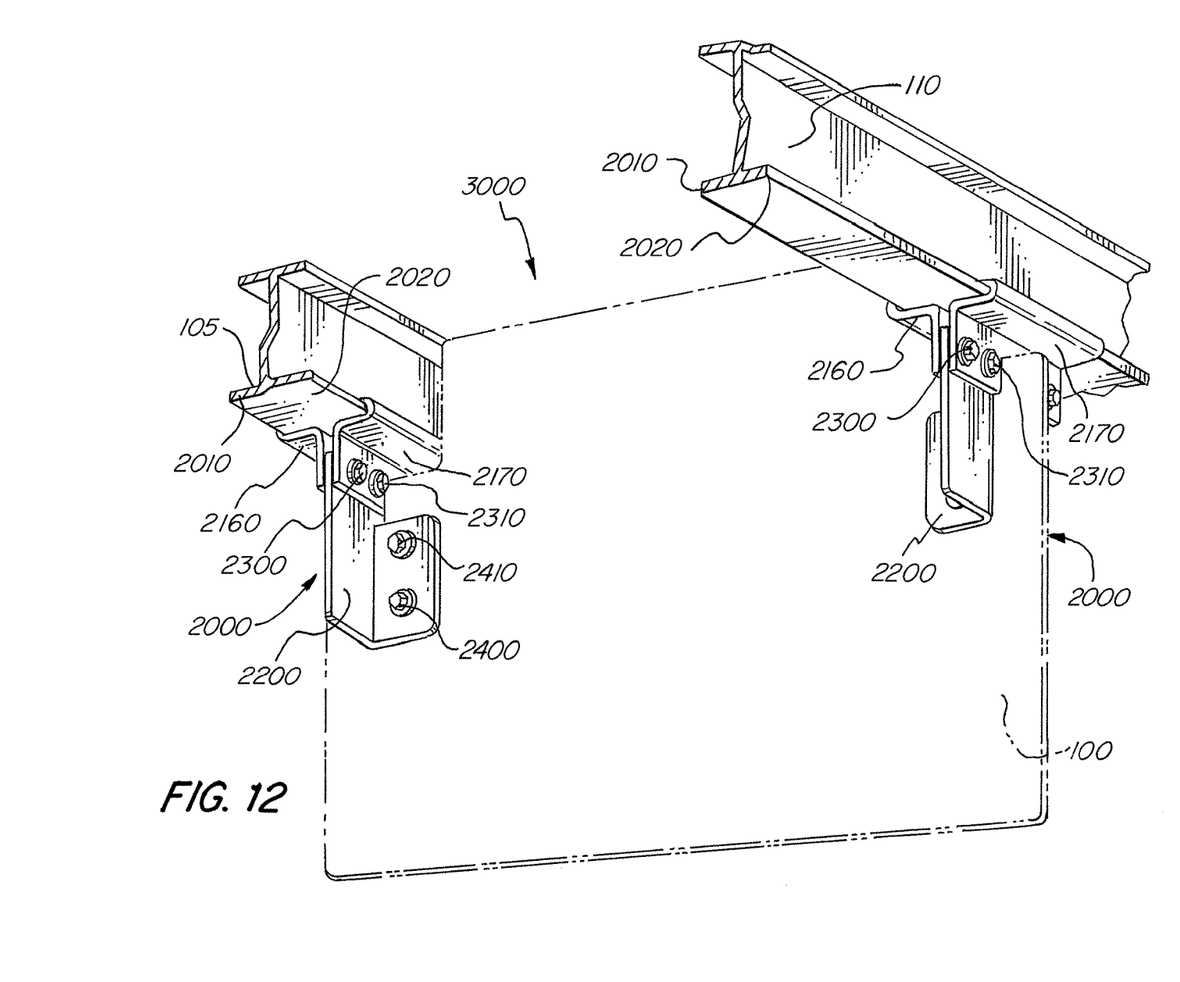
FIG. 12 is a perspective view of the Haldex® clamping system.

Another embodiment of the present invention involves clamping system 3000, shown in FIG. 12. Clamping system 3000 comprises a pair of clamps 2000 for engaging two separate mounting surfaces 105,110, said clamps 2000 each having a pair of oppositely disposed clamping members 2100, 2150 for engaging laterally opposite flanges 2010, 2020 of said mounting surfaces 105, 110, each clamping member having a lug portion 2160, 2170 thereof, said clamps each having a pair of brackets 2200, 2250 disposed between said lug portions of said clamping members 2100, 2150, wherein said brackets 2200, 2250 are secured to said clamping members via fasteners 2300, 2310, 2320, 2330; and a module panel 100, said module panel 100 secured to each of said clamps 2000.

The clamping system may further have fasteners 2300, 2310, 2320, and 2330 secure the module panel 100 to each of said clamps 2000. The clamping system may have its clamping members 2100, 2150 of the clamps 2000 be C-shaped. The brackets 2200, 2250 of each of the clamps may be L-shaped. The brackets 2200, 2250 on each of the clamps 2000 may face each other to form a T-shape, forming a groove 2500 in between the brackets 2200, 2250 for each of the clamps 2400.

A panel 100 may be disposed in groove 2500 and the panel 100 is secured to the brackets 2200, 2250 of each of the clamps 2000 via fasteners 2400, 2410. The clamping system may have mounting surfaces 105,100 selected from a group consisting of an I-beam or a C-channel, or a combination thereof.

Another embodiment of the present invention involves a method for assembly of a clamp 2000 comprising: introducing a pair of oppositely disposed clamping members 2100, 2150 for engaging laterally opposite flanges 2010, 2020 of a mounting surface 105, 110, each clamping member 2100, 2150 having a lug portion 2160, 2170 thereof; introducing a pair of brackets 2200, 2250; disposing the brackets 2200, 2250 between the lug portions 2160, 2170 of the clamping members 2100, 2150; and fastening said brackets 2200, 2250 to said clamping members 2100, 2150.

The method may involve clamping members 2100, 2150 that are C-shaped and/or brackets 2200, 2250 that are L-shaped. The method may further involve fasteners 2300, 2310, 2320, 2330 that tighten the clamping members 2100, 2150 around the I-beam to secure the clamp 2000 to the I-beam.

The method may further involve inserting a panel 100 between the brackets 2200, 2250 and securing said panel 100 to said brackets 2200, 2250 via fasteners 2400, 2410.

Another embodiment of the present invention involves a method for providing a system module 1000 that can be easily be removed and replaced to minimize trailer/dolly downtime. The method allows for a system module 1000 to be quickly attached to a trailer dolly vehicle. The method also further allows for a system module 1000 to be quickly replaced with another system module 1000, allowing for continued use of the trailer/dolly vehicle. This method involves using the apparatus described in other embodiments of the invention. By using the design of the apparatus, a system module 1000 can be easily installed and removed from the mounting surface.

The method further involves reducing the installation time of a system module 1000, and eliminating errors that result during the installation of the system module 1000. Furthermore, the method minimizes operation cost in both early and unnecessary repair and replacement cost, and minimizing catastrophic failures resulting in insurance cost saving.

The method comprises the following steps of introducing a system module 1000, introducing a mounting element 115, 120 described in the apparatus of the invention, wherein the mounting element attaches the system module 1000 to a mounting surface 105, 110 on a vehicle. Various mounting elements 115, 120 may be used for the attachment of the system module 1000 to the mounting surface 105, 110.

The method further involves the step of removing and replacing the system module 1000 by disengaging said system module 1000 from said mounting element 115, 120, introducing a second system module 1000, and engaging said second system module 1000 with said mounting element 115, 120, wherein said second system module 1000 allows for continued use of the vehicle. The method can be performed by a human, such as a mechanic, or in certain embodiments, robots and machines can be used to replace the system module.

The method uses a mounting surface 105, 110 selected from a group consisting of an I-beam or C-channel, however, the mounting surface 105, 110 can be another part associated with a trailer/dolly vehicle. Furthermore, the mounting element 115, 120 is selected from a group consisting of welding, a fastening device, and/or a clamping device, however, other methods may also be used to connect the system module 1000 to the mounting surface 105, 110. Welding is typically used in combination with other fasteners as the ability of the other fasteners allows the system module to be easily removable. More than one of these methods can be used in conjunction with one another to mount the system module 1000 to the mounting surface 105, 110.

The method further applies to a vehicle from a group consisting of, but not limited to semi-trailers, dolly, semi-trailer trucks, lorry's, side lifters, reefers, vans, flat beds, tanker trailers, dump trailers, road trains, or other commercial and heavy duty vehicles that use air/hydraulic systems.

The method further comprises the step of easing the installation of the system module 1000. The method further comprises the step of servicing the system module 1000 and inserting the system module 1000 into another vehicle. This allows for system modules to be used interchangeably, thus minimizing downtime of the vehicle. This downtime can be limited, whereby the time to remove and replace a system module with a second system module takes under an hour. More preferably, the downtime can be limited to 30 minutes, whereby it take approximately 30 minutes or less to remove and replace a system module from a mounting surface.

Furthermore, in specific embodiments, the system module is preferably a trailer/dolly air brake system module.

While the invention has been specifically described in connection with certain specific embodiments thereof, it is to be understood that this is by way of illustration and not of limitation and that various changes and modifications in form and details can be made thereto, and the scope of the appended Claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An anti-lock brake system module for a trailer or dolly, comprising:
   a module panel having a front side and a back side facing in an opposite direction to the front side;
   a plurality of anti-lock brake system components, at least a portion of said components attached to the front side of said module panel and at least a portion of said components attached to the back side of said module panel;
   said plurality of anti-lock brake system components including an anti-lock brake valve and an electronic control unit; and
   a mounting element for removably connecting said module panel to a mounting location of the trailer or dolly, the mounting element including a first member attached to a first side of said module panel and a second member attached to a second side of said module panel, each of the first and second members including an opening to receive and at least partially clamp around a portion of the mounting location.

2. The system according to claim 1, further comprising an air brake monitoring system attached to one of the front side and the back side.

3. The system according to claim 1, further comprising:
   a booster valve, a manifold valve, and a check valve, each attached to at least one of the front side and the back side of said module panel.

4. An anti-lock brake system module for a trailer or dolly, comprising:
   a module panel having a front side and a back side facing in an opposite direction to the front side;
   a plurality of anti-lock brake system components, at least a portion of said components attached to the front side of said module panel and at least a portion of said components attached to the back side of said module panel;
   said plurality of anti-lock brake system components including an anti-lock brake valve and an electronic control unit; and
   a mounting element for removably connecting said module panel to a mounting location of the trailer or dolly, wherein said mounting element includes a pair of oppositely disposed clamping members, each of the clamping members including a clamping portion for receiving an edge of the mounting location.

5. The system according to claim 4, wherein the mounting location is an I-beam.

6. The system according to claim 4, each of the clamping members further including a lug portion extending from the clamping portion to attach the clamping member to said module panel.

7. The system according to claim 6, further comprising:
a pair of brackets engaging the lug portions of the clamping members, wherein a first one of the brackets attaches to the front side of said mounting panel and a second one of the brackets attaches to the back side of said mounting panel.

8. The system according to claim 1, further comprising a plurality of brake lines on at least one of the front side and the back side.

9. The system according to claim 1, wherein said module panel is a flat panel.

10. The system according to claim 1, wherein the anti-lock brake valve is a 2-port valve.

11. The system according to claim 1, wherein the anti-lock brake valve is a 6-port valve.

12. The system module of claim 1, further comprising:
a plurality of pressure valves attached to at least one of the front side and the back side of said module panel.

13. The system according to claim 1, further comprising a tire inflation system attached to at least one of the front side and the back side of said module panel.

14. The system according to claim 1, wherein each of the first and second members includes a lug portion, wherein each of the lug portions having a groove extending in from a distal edge of the lug portion.

15. An anti-lock brake system module for a trailer or dolly, comprising:
a module panel having a first side and a second side;
a plurality of anti-lock brake system components, at least a portion of said components attached to the first side of said module panel and at least a portion of said components attached to the second side of said module panel;
said plurality of anti-lock brake system components including an anti-lock brake valve and an electronic control unit;
a pair of oppositely disposed clamping members, each the clamping members engaging laterally opposite flanges of a mounting location of the trailer or dolly, each of the clamping members having a lug portion;
wherein one of said module panel and a bracket connected to said module panel is received and removably fastened between the lug portions of said pair of oppositely disposed clamping members.

16. The system according to claim 15, further comprising an air brake monitoring system attached to one of the first side and the second side.

17. The system according to claim 15, where the first side is facing in an opposite direction to the second side.

18. The system according to claim 15, further comprising:
a booster valve, a manifold valve, and a check valve, each attached to at least one of the first side and the second side of said module panel.

19. The system according to claim 15, wherein the mounting location is an I-beam.

20. The system according to claim 15, wherein the anti-lock brake valve is one of a 2-port valve and a 6-port valve.

* * * * *